(12) United States Patent
Yoshinaga et al.

(10) Patent No.: US 12,084,057 B2
(45) Date of Patent: Sep. 10, 2024

(54) VEHICLE CONTROLLER

(71) Applicant: HONDA MOTOR CO., LTD., Tokyo (JP)

(72) Inventors: Takuya Yoshinaga, Tokyo (JP); Hisanori Yanagida, Tokyo (JP); Zhenxiong Huang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 17/703,335

(22) Filed: Mar. 24, 2022

(65) Prior Publication Data

US 2022/0306110 A1    Sep. 29, 2022

(30) Foreign Application Priority Data

Mar. 26, 2021  (JP) .................................. 2021-052612

(51) Int. Cl.
*B60W 30/18* (2012.01)
*B60W 50/10* (2012.01)

(52) U.S. Cl.
CPC ...... *B60W 30/18109* (2013.01); *B60W 50/10* (2013.01); *B60W 2510/1025* (2013.01); *B60W 2510/18* (2013.01)

(58) Field of Classification Search
CPC ........... B60W 30/18109; B60W 50/10; B60W 2510/1025; B60W 2510/18; B60W 10/182; B60W 50/0225; B60W 10/04; B60W 10/18; B60W 50/0205; B60K 28/14; B60T 13/74
See application file for complete search history.

(56) References Cited

U.S. PATENT DOCUMENTS

| | | | |
|---|---|---|---|
| 10,377,382 B2 | 8/2019 | Senba et al. | |
| 2014/0151164 A1* | 6/2014 | Yokoyama | B60T 1/065 188/72.3 |
| 2014/0188362 A1* | 7/2014 | Kotake | B60T 13/741 701/70 |
| 2017/0361846 A1* | 12/2017 | Senba | B60T 13/686 |
| 2018/0244283 A1* | 8/2018 | Geißenhöner | B60W 50/0205 |
| 2019/0084557 A1* | 3/2019 | Nakade | B62D 15/0285 |
| 2020/0283008 A1* | 9/2020 | Kim | B60W 10/182 |

FOREIGN PATENT DOCUMENTS

| | | | | |
|---|---|---|---|---|
| GB | 2327108 A | * | 1/1999 | .......... F16D 48/066 |
| JP | 6519536 B2 | | 5/2019 | |

* cited by examiner

*Primary Examiner* — Kurt Philip Liethen
(74) *Attorney, Agent, or Firm* — Rankin, Hill & Clark LLP

(57) ABSTRACT

A vehicle controller is provided, including: a drive source generating drive torque in a vehicle; a brake applying braking force to wheels; a drive torque control unit controlling the drive torque; a braking force control unit controlling the braking force; an EPB operation instructing unit instructing operation of an electric parking brake; and an electric parking unit, including the parking brake and a driver driving the electric parking brake to cause the electric parking brake to operate in response to the EPB operation instructing unit. The drive torque control unit implements, based on an operation instruction status of the EPB operation instructing unit, driving force restriction control to restrict the drive torque, and when an operation instruction status becomes unknown while the driving force restriction control is implemented, the driving force restriction control is continued regardless of the operation status of the EPB operation instructing unit.

4 Claims, 3 Drawing Sheets

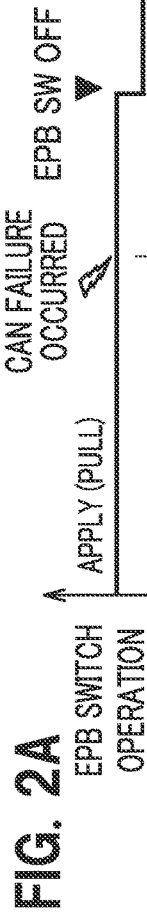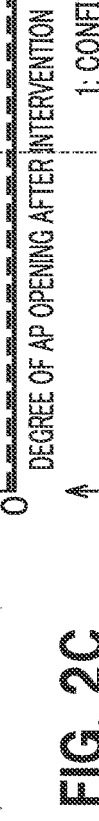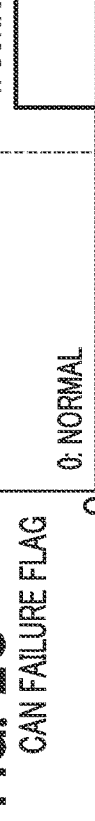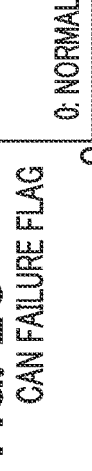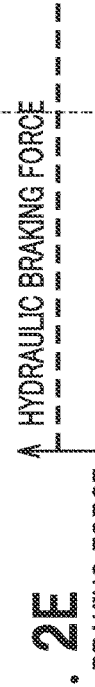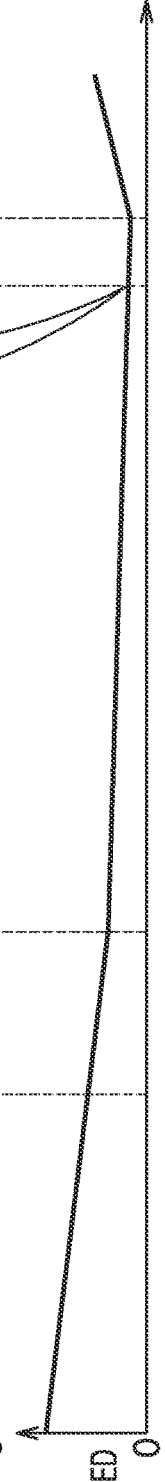

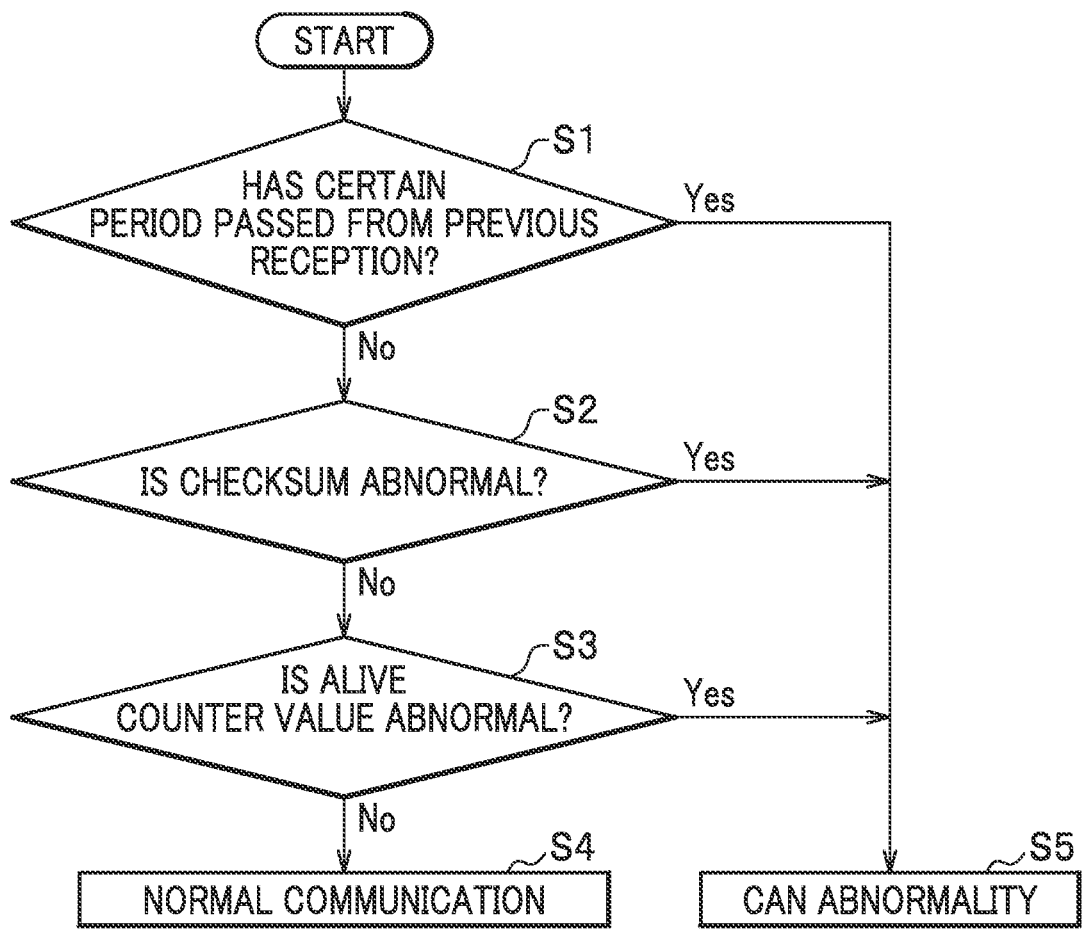

VEHICLE CONTROLLER

TECHNICAL FIELD

The present invention relates to a vehicle controller.

BACKGROUND ART

Japanese Patent No. 6519536 discloses that when an operation switch for an electric parking brake (EPB) is operated during vehicle traveling, braking force is given to the vehicle to restrict driving force (dynamic EPB).

SUMMARY OF INVENTION

Technical Problem

However, in the technology of Japanese Patent No. 6519536, when a driver is depressing an accelerator pedal and the driving force is limited (the degree of actual accelerator pedal opening is reduced) due to dynamic EPB operation, a communication error may occur between the ECU (Electronic Control Unit) of the electric parking brake and the ECU of a power plant. When such a communication error occurs, the operation status of the EPB switch cannot be determined, and the deactivation timing of the driving force restriction control becomes unknown. Here, the driving force restriction control may be reduced (deactivated) as is the general behavior in the case of a device failure (communication failure). In this case, the driver is depressing the accelerator pedal, and as a result of which the degree of actual accelerator pedal opening becomes larger. Consequently, the vehicle starts to accelerate, so that unintended vehicle acceleration may occur.

Here, the present invention addresses the problem of providing a vehicle controller such that when the operation status of the EPB operation switch becomes unknown while the driving force is restricted due to dynamic EPB operation, it is possible to prevent the vehicle from having unintended acceleration.

Solution to Problem

The present invention provides a vehicle controller including: a drive source generating drive torque in a vehicle; a brake applying braking force to wheels; a drive torque control unit controlling the drive torque; a braking force control unit controlling the braking force; an EPB operation instructing unit instructing operation of an electric parking brake; and an electric parking unit, including the parking brake and a driver driving the electric parking brake to cause the electric parking brake to operate in response to the EPB operation instructing unit. The drive torque control unit implements, based on an operation instruction status of the EPB operation instructing unit, driving force restriction control to restrict the drive torque, and when an operation instruction status becomes unknown while the driving force restriction control is implemented, the driving force restriction control is continued regardless of the operation status of the EPB operation instructing unit.

Advantageous Effects of Invention

The invention can provide a vehicle controller such that when the operation status of an EPB operation switch (EPB operation instructing unit) becomes unknown while the driving force is restricted due to dynamic EPB operation, it is possible to prevent the vehicle from having unintended acceleration.

BRIEF DESCRIPTION OF DRAWINGS

FIG. 2A to FIG. 2F are timing charts of respective elements of a vehicle controller according to an embodiment of the invention; and FIG. 3 is a flow chart illustrating a drive torque control unit of a vehicle controller according to an embodiment of the invention.

DESCRIPTION OF EMBODIMENTS

Figure 1:
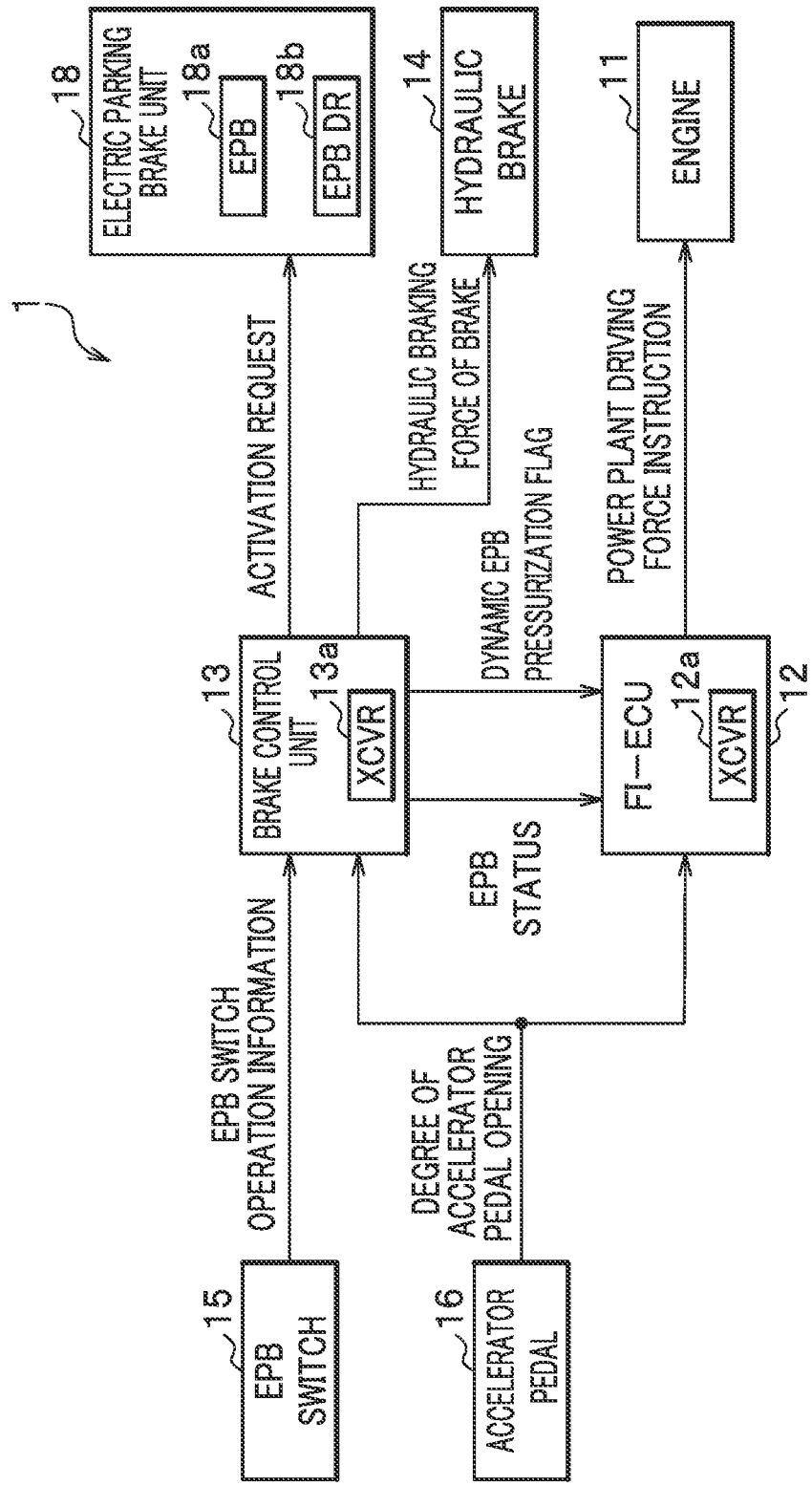
FIG. 1 is a diagram showing how to configure a vehicle controller system according to an embodiment of the invention.

Hereinafter, an embodiment of the invention will be described with reference to the Drawings.

FIG. 1 is a diagram showing how to configure a vehicle controller system according to an embodiment of the invention. A vehicle controller 1 is provided with an FI-ECU 12 (drive torque control unit) configured to control the drive torque of an engine 11 as a drive source for generating drive torque in a vehicle. That is, the FI-ECU 12 sends a power plant driving force instruction to control driving force by the engine 11. This vehicle is a gasoline vehicle using only an engine as a drive source. However, this vehicle may be configured as an electric vehicle (including a fuel cell vehicle) using only a motor as a drive source or a hybrid vehicle using both a motor and an engine as drive sources.

A brake control unit 13 (braking force control unit) controls braking force of a hydraulic brake 14, which is a brake configured to apply braking force to wheels of the vehicle. In addition, the brake control unit 13 activates (operates) an electric parking brake (EPB) unit 18 including an electric parking brake (actually braking part; a braking mechanism) 18a. and a driver 18b to drive the electric parking brake to cause the electric parking brake to operate in response to the EPB operation instructing unit 15, Specifically, by operating an EPB switch 15 (EPB operation instructing unit) installed in a cabin, EPB switch operation information is transmitted to the brake control unit 13. Accordingly, the brake control unit 13 sends an activation request to the electric parking brake unit 18. As a result, the electric parking brake 18a is activated.

Accelerator pedal opening information output from an accelerator pedal 16 (acceleration operator) is output to the FI-ECU 12 and the brake control unit 13.

When the EPB switch 15 is operated during vehicle traveling, dynamic EPB control is implemented. Specifically, the brake control unit 13 controls the hydraulic brake 14 to apply braking force (dynamic EPB brake control). In addition, the brake control unit 13 transmits, to the FI-ECU 12, information where the dynamic EPB pressurization flag is set, which flag indicates that braking force is being applied by dynamic EPB. Then, driving force restriction control to restrict the drive torque of the engine 11 is carried out (i.e., the degree of actual accelerator pedal opening is reduced).

The brake control unit 13 has a CAN transceiver 13a. The EPB status (EPB operation instruction status), which reports whether or not the EPB switch 15 is operated, is sent to the FI-ECU 12 via CAN (Controller Area Network).

The FI-ECU 12 includes a CAN transceiver 12a to receive the EPB status and the dynamic EPB pressurization flag, the EPB status. When the operation instruction status of the EPB switch 15 becomes unknown while the driving force restriction control is implemented, the FI-ECU 12 continues the driving force restriction control regardless of the operation status of the EPB switch 15. The case where the operation status of the EPB switch 15 becomes unknown refers to, for instance, a situation in which the EPB status is not transmitted to the FI-ECU 12 due to a CAN failure. Examples of the case include cases where normal information cannot be received for a certain period of time due to a disconnection or short circuit in the communication path, a failure of the transmitter or receiver, or a communication failure caused by external noise. As for the EPB status, three statuses are transmitted numerically, including pressing the switch: EPB deactivation instruction, pulling the switch: EPB activation instruction, and not operating the switch: continued activation/deactivation instruction.

FIG. 3 is a flow chart illustrating how the FI-ECU 12 works, and shows how to detect an CAN reception abnormality (a communication failure including a communication error) from the brake control unit.

At step S1, the FI-ECU 12 determines whether a certain period (a period sufficiently longer than a normal time interval) has passed from the previous reception. The case of "Yes" is determined as a CAN error including a communication failure. In the case of "No", at step S2, where a certain period has not passed from the previous reception, the FI-ECU 12 determines the presence or absence of a checksum abnormality in data received. The case with an abnormality (Yes) is determined as a CAN reception abnormality (a communication failure including a communication error) at step S5. In the case of "No", at step S3, the FI-ECU 12 determines the presence or absence of an alive counter value abnormality. Specifically, the presence of abnormality is determined in the case (Yes) where alive data cannot be received even if the alive data is continuously transmitted for a given period and a non-communication state remains for a predetermined period or longer (step S5). In other words, at the step S5, it can be determined that the operation instruction status of the EPB operation instruction unit becomes unknown. In the case of "No", the communication is determined to be normal (step S4).

Next, when the operation of the accelerator pedal 16 by the driver is detected and the above driving force restriction control is implemented, the FI-ECU 12 may detect that the operation status of the EPB switch 15 has become unknown. In this case, the above driving force restriction control is deactivated when the accelerator pedal 16 is released.

The EPB switch 15 may be turned off or the accelerator pedal 16 may be released. Then, the accelerator pedal 16 may then be operated again. At this time, the dynamic EPB brake control should be deactivated.

Next, a specific example of how the vehicle controller 1 works will be described. FIGS. 2A to 2F are timing charts of respective elements of the vehicle controller 1. The "EPB SWITCH OPERATION" in FIG. 2A indicates ON or OFF of the EPB switch 15 (EPB status). The "DEGREE OF AP (ACCELERATOR PEDAL) OPENING" in FIG. 2B is the degree of accelerator pedal 16 opening. The FI-ECU 12 receives the degree of Dr AP (accelerator pedal) opening, that is, the degree of opening of the accelerator pedal 16 actually depressed by a driver (the dashed-dotted line in FIG. 2B), and generates (calculates) the degree of AP (accelerator pedal) opening after electronically controlled intervention (adjustment) as treated as the degree of current (accelerator pedal) opening (the solid line in FIG. 2B), and the degree of AP opening for control (dashed line in FIG. 2B) from the degree of Dr AP (accelerator pedal) opening for controlling.

As described above, the FI-ECU 12 sets a "CAN FAILURE FLAG" at the time of detecting a CAN reception abnormality (communication failure including a communication error). This indicates the presence or absence of failure in the EPB status (CAN communication failure) (FIG. 1).

The "EPB STATUS" in FIG. 2D indicates the condition of the EPB status (FIG. 1).

The "BRAKING FORCE" in FIG. 2E indicates hydraulic braking force of the hydraulic brake 14 and the parking brake braking force of the electric parking brake 18a in the electric parking brake unit 18.

The "VEHICLE SPEED" in FIG. 2F indicates the speed of the vehicle. The ordinate represents the magnitude of the speed.

This timing chart shows the case where the EPB switch 15 is initially ON (pulling operation). Thus, even if the degree of Dr AP opening is high, the degree of AP opening after intervention (adjustment) is set to 0. Accordingly, the driving force restriction control is implemented. In addition, the hydraulic braking force is increased to implement dynamic EPB brake control. This causes the vehicle speed to decrease.

Meanwhile, a CAN failure may occur, resulting in a situation where the EPB status cannot be transmitted to the FI-ECU 12. In the FI-ECU 12, the condition of the EPB status becomes unidentifiable. The FI-ECU 12 sets a CAN failure flag when the FI-ECU 12 detects that the condition of the EPB status is unidentifiable. However, the FI-ECU 12 continues the driving force restriction control after the event while the degree of AP opening after intervention (adjustment) is kept as 0. That is, this makes it possible to prevent, by the vehicle control in this embodiment, the vehicle from having unintended acceleration.

Next, as shown in FIG. 2A, the EPB switch 15 is turned OFF. Then, the hydraulic braking force, namely the dynamic EPB brake control is deactivated (the braking force becomes 0 as illustrated in FIG. 2E).

After that, the accelerator pedal 16 may be released by the driver. When the degree of Dr AP opening is, for instance, 0, the driving force restriction control is deactivated. Due to this, the degree of AP (accelerator pedal) opening for control increases.

As a basic control, the degree of AP opening for control is usually at the upper limit. As the degree of AP opening after intervention (the solid line in FIG. 2), the degree of AP opening for control (the dashed line in FIG. 2B) or the degree of Dr AP opening (the dashed-dotted line in FIG. 2B), whichever is smaller, is adopted. This can realize that the degree of AP opening is suppressed even if the driver depresses the accelerator pedal 16.

When the accelerator pedal 16 is released by the driver, the degree of AP opening for control may be increased gradually. In this case, at the time of next depression of the accelerator pedal 16 by the driver, the degree of AP opening for control (the degree of AP opening after intervention) should be adopted as a smaller value of the degree of AP opening for control or the degree of Dr AP opening. Thus, when the accelerator pedal 16 is depressed earlier than return of the degree of AP opening for control as gradually implemented as described above, the degree of AP opening for control (the degree of AP opening after intervention) becomes a smaller value. Consequently, an output corresponding to the degree of Dr AP opening cannot be achieved (the driving force cannot be generated). Thus, at the time-point where the degree of AP opening for control is larger than the degree of Dr AP opening, the degree of AP opening for control (the degree of AP opening after intervention) should be set to the upper limit. This enables the value for the degree of Dr AP opening to be output (the driving force corresponding to the value for the degree of opening can be generated).

According to the vehicle controller 1 described above, even if the operation status of the EPB switch 15 becomes unknown (even if a communication error occurs) while the driving force is restricted due to dynamic EPB operation, the driving force restriction will continue. As a result, unintended acceleration of the vehicle can be prevented.

Also, when the driver releases the accelerator pedal 16 and then depresses the accelerator pedal 16 again afterwards (the driver has an intention to accelerate), driving force restriction control is deactivated. This allows the vehicle to accelerate according to the driver's intention.

In addition, when the EPB switch 15 is turned off and the accelerator pedal is then depressed again, the dynamic EPB braking control is deactivated. This prevents the driver from dragging the brake when the driver has an intention to accelerate.

Note that the brake is not limited to a hydraulic brake, and may also be a mechanical brake. Here, brakes in multiple forms may each be used.

In addition, the EPB pressurization flag has been used. However, the status may include a dynamic EPB condition. The driving force may be restricted when the status has been received.

REFERENCE SIGNS LIST

1 Vehicle controller
11 Engine (drive source)
12 FI-ECU (drive torque control unit)
13 Brake control unit (braking force control unit)
14 Hydraulic brake (brake)
15 EPB switch (EPB operation instructing unit)
16 Accelerator pedal (acceleration operator)
18 Electric parting brake unit (EPB operation unit)
18*a* Electric parking brake

The invention claimed is:

1. A vehicle controller comprising:
a drive source configured to generate drive torque in a vehicle;
a brake configured to apply braking force to wheels of the vehicle;
a first electronic control unit configured to control the drive torque generated by the drive source;
a second electronic control unit configured to control the braking force of the brake;
an electric parking brake switch configured to instruct operation of an electric parking brake; and
an electric parking brake unit, including the electric parking brake, configured to operate the electric parking brake and a driver to drive the electric parking brake to operate in response to the electric parking brake switch, wherein
the first electronic control unit is configured to:
implement driving force restriction control based on an operation instruction status of the electric parking brake switch, the driving force restriction control restricting the drive torque;
continue, when the operation instruction status of the electric parking brake switch becomes unknown while the driving force restriction control is being implemented, the driving force restriction control of restricting the drive torque regardless of whether the electric parking brake switch is on; and
when an acceleration operator is in operation and the operation instruction status of the electric parking brake switch becomes unknown during implementation of the driving force restriction control, discontinue the driving force restriction control once the operation of the acceleration operator is released.

2. The vehicle controller according to claim 1, wherein the operation instruction status of the electric parking brake switch is transmitted via the second electronic control unit to the first electronic control unit, and
a case where the operation instruction status of the electric parking brake switch is unknown is caused by either a communication error or a communication failure between the second electronic control unit and the first electronic control unit.

3. The vehicle controller according to claim 1, wherein the second electronic control unit is configured to:
implement dynamic EPB brake control of applying, based on the operation instruction status of the electronic parking brake switch during vehicle traveling, the braking force to the wheels; and
deactivate the dynamic EPB brake control when the electric parking brake switch is turned off or when the acceleration operator is re-operated after the acceleration operator is released.

4. The vehicle controller according to claim 2, wherein the second electronic control unit is configured to:
implement dynamic EPB brake control of applying, based on the operation instruction status of the electric parking brake switch during vehicle traveling, the braking force to the wheels; and
deactivate the dynamic EPB brake control when the electric parking brake switch is turned off or when the acceleration operator is re-operated after the acceleration operator is released.

* * * * *